Figure 1:
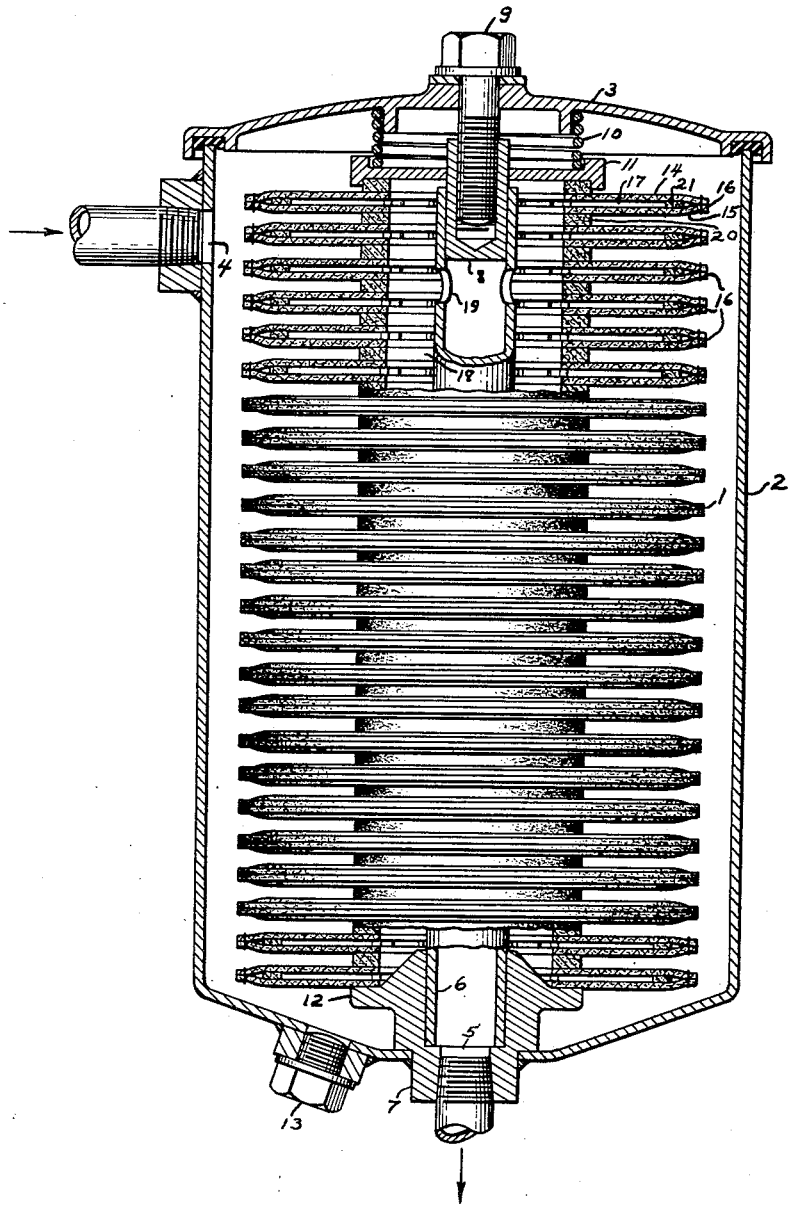

Dec. 21, 1954 W. A. FOUST 2,697,524
LIQUID FILTER CARTRIDGE
Filed June 22, 1950 2 Sheets-Sheet 1

Inventor
William A. Foust,
by George H. Baldwin
His Attorney.

Dec. 21, 1954  W. A. FOUST  2,697,524
LIQUID FILTER CARTRIDGE
Filed June 22, 1950  2 Sheets-Sheet 2
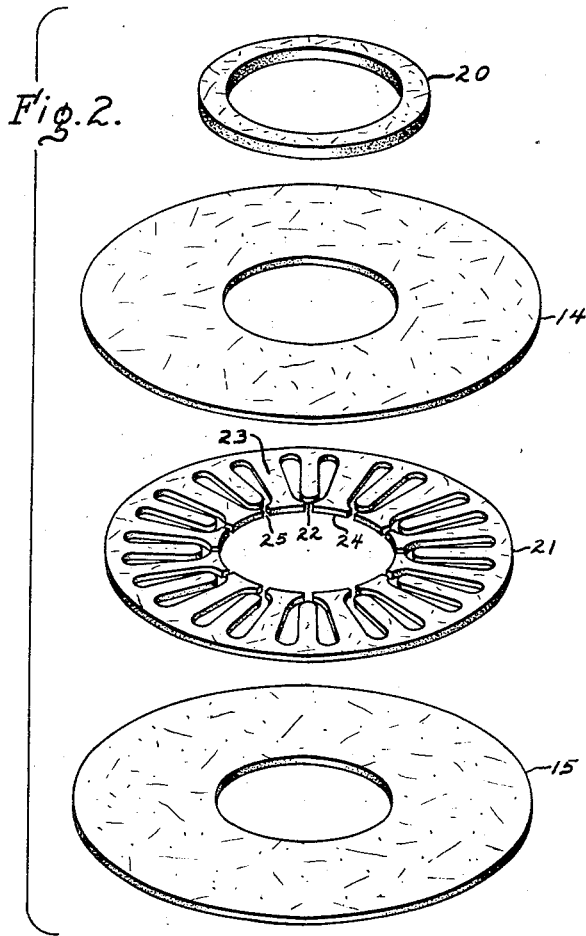
Fig. 2.
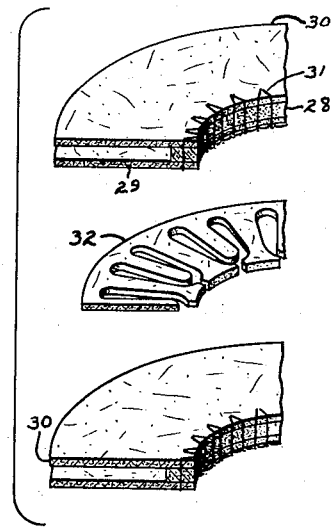
Fig. 4.
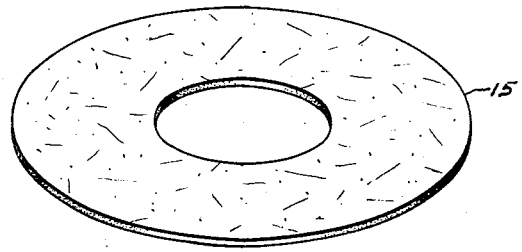
Fig. 3.
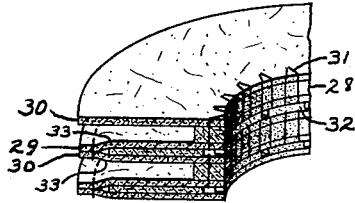
Fig. 5.
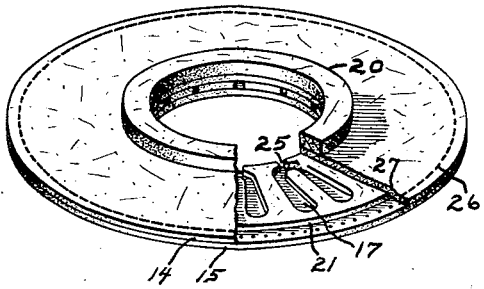
Inventor
William A. Foust,
by George H. Baldwin
His Attorney United States Patent Office 2,697,524
Patented Dec. 21, 1954

2,697,524

LIQUID FILTER CARTRIDGE

William A. Foust, Jacksonville, Fla.

Application June 22, 1950, Serial No. 169,625

1 Claim. (Cl. 210—169)

My invention relates to an improved liquid filter cartridge and, more particularly, to filter cartridges comprising a plurality of liquid-pervious members.

An object of the invention is to provide an improved liquid filter cartridge which will resist collapse or destruction from high pressures of the liquid being filtered or from excessive clamping forces.

It is a further object of my invention to provide a liquid filtering cartridge of the type comprising a plurality of elements or sections which will not pass, under any conditions, the liquid from the inlet channel to the outlet channel of the filter except through a filtering member of the cartridge.

A more specific object of the invention is to eliminate the possibility of the liquid bypassing the filtering element when the filter is subjected to vibration or when subjected to distortion from any cause.

An additional object of the invention is to provide an oil filter cartridge which is economical to produce, sturdy, and characterized by a long life and high flow rate, with a high capacity for retained contaminant and with a large filtering area, and is further characterized by increased resistance to the crushing effect of high differential pressures of the liquid across the filter cartridge and of high pressures exerted by the members holding the cartridge in place in the filter tank body.

Fuel oil and lubricating oil filters composed of a plurality of members of wood pulp sheet material, or of other cellulosic compositions, have been widely used in the past. Such cartridges are usually formed as a stack of discs of such material held together between the top and bottom walls of a filter tank by the pressure of a clamping spring. Difficulty has been experienced in certain constructions of this nature under conditions of severe vibration. These difficulties have arisen through the tendency of the members to separate by compressing the positioning spring, and also by a tendency of the material of which the cartridge is constructed to be compressed through the action of the spring and the motion produced by the vibration until the filter is no longer firmly held between the top and bottom walls of the filter tank, and the liquid may then escape between the layers of filtering material often carrying with it, not only its own contaminant, but also contaminant previously deposited on the cartridge.

It is an object of my invention, accordingly, to overcome these tendencies.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings, in which Fig. 1 is a partially sectionalized side view of a filter cartridge in accord with the preferred embodiment of my invention arranged in a suitable filter tank; Fig. 2 is an exploded view of a single filtering element of the complete cartridge of Fig. 1, and Fig. 3 is a partially sectionalized view of such single filtering element; Fig. 4 is an exploded view of parts of several filtering elements showing details of construction of a modified embodiment of my invention; and Fig. 5 is a sectional view of a small part of a complete filter cartridge in accord with the modified construction shown in Fig. 4.

Referring now to Fig. 1 of the drawings, the filter cartridge indicated generally at 1 is disposed in a tank 2 comprising a cup-shaped metal member and a cover member 3. A side port 4 is provided preferably as an inlet port and a bottom outlet port 5 is arranged to communicate with the interior of a centrally disposed pipe or tube 6. Tube 6 is connected at the bottom to a plug 7 forming a part of the tank 2, extends up through tank 2, and carries at its upper end plug 8 having an internal screw-threaded bore. This bore receives a bolt 9 which serves to hold cover 3 in position to form the top wall of tank 2. Compression spring 10 is arranged to press washer 11 downwardly against the top of the filter 1 and to hold it firmly against shoulder 12 of plug 7. The outermost members of the filter cartridge, if desired, may be glued to shoulder 12 at the bottom and to washer 11 at the top. Washer 11 fits closely about plug 8 to prevent leakage of oil from the area above the washer between the washer and the outer surface of plug 8. Suitable packing may be provided at this point if necessary. A drain plug 13 is shown at the bottom of the filter tank. It will be understood that the filter tank construction shown in Fig. 1 and described above forms no part of my invention but is exemplary only of the class of filter tanks with which cartridges in accord with my invention are particularly adapted for use.

In use, oil or other liquid to be filtered may enter inlet port 4 to completely surround the filter cartridge 1. This oil may pass through either filtering surface or diaphragm 14 or 15 of any one of the individual filtering elements 16 and flow through a channel 17 formed between the filtering members 14 and 15, as later described. Several channels 17 of each element communicate with a central opening 18 formed from top to bottom of the filter cartridge. It will be noted that this central opening 18 is completely enclosed by the individual filtering elements, along the sides, and by washer 11 and plug 7 at the top and bottom, respectively. The central opening further communicates with the interior of tube 6 through one or more ports 19 formed in the wall of the tube.

The individual filtering elements 16 which form the cartridge 11 are preferably glued successively together adjacent the central opening. A spacer ring 20 is provided between confronting filter faces of adjacent elements 16, and the ring 20 is glued in place at its upper and lower faces, respectively, to the lower and upper filter diaphragms of the adjoining elements. The filtering diaphragms 14 and 15 of each element are separated by a separator member 21 in which channels 17 are formed.

The construction of each filtering element is best seen in Figs. 2 and 3, to which attention is now invited. The element, as seen in these figures, comprises annular disc-shaped diaphragms 14 and 15, which normally perform the filtering function, and which are made of a liquid-pervious wood fiber sheet or of other cellulosic material, a separator 21, which may be of the same material, and may be of about the same thickness as the filter discs, and a spacer 20, which may also be of the same material, but which is preferably twice as thick. A preferably round hole is formed through each of the four separate members of the individual filtering element, and these holes align to provide the longitudinal central opening of the complete cartridge. It will be understood that the spacer 20 and separator 21 may be formed, as desired, of a pervious or impervious material.

Separator 21 is of slightly less diameter than filtering members 14 and 15 and is cut out to present a continuous peripheral outer edge but to provide channels 17 communicating through the surface bounding the central hole. According to my invention the channels 17 are formed between projections extending radially inward from a location near the outer periphery of the member toward the central opening. These projections are of two distinct shapes alternately around the member. Projections 22 terminate short of the central opening while projections 23 extend to and bound the central opening. The projections 22 preferably terminate in a rounded end, whereas projections 23 terminate in an abruptly widened portion at the central opening. The wide portions 24 of adjacent projections 23 are separated by a gap 25 having a width equal to approximately one-third of the width of the portion 24. This gap 25 communicates with and forms a part of the channels 17 on opposite sides of each projection 22, and it will be readily apparent from the drawing that any liquid which enters any part of a channel 17 may flow along the channel past the end of projection 22 and through the gap 25 into the central opening.

The members shown in Fig. 2 are preferably assembled together into an individual filtering element as shown in Fig. 3. In constructing the element a lower filtering member 15 and an upper filtering member 14 are preferably stitched together adjacent the peripheries thereof by a row of stitching 26. The fibrous material members 14 and 15 are deformed, as shown in Figs. 1, 3 and 5 of the drawings, by the stitching operation to bend toward one another outside of the outer peripheral edge and to engage against said edge. A separator 21 is disposed between the two filtering members prior to the stitching and is held in place therebetween without any additional fastening. Spacer 20 is then glued to the exposed surface of the upper filtering member 14, each of the four members making up the element being arranged to align their respective central openings.

It may be readily understood from a consideration of Fig. 3 that the liquid to be filtered may pass through either filtering diaphragm 14 or 15 into any of the channels 17 and thence through a corresponding gap 25 into the central opening.

A particular feature of the construction concerns the position of the periphery of separator 21 in respect to the stitches 26. It will be noted that the diameter of separator 21 is less than the diameter of the row of stitches and that filtering members 14 and 15 must bend toward each other when stitched tightly together. The resultant crimping of the filtering members which takes place as shown at 27 tends to hold the separator in position, with its central hole exactly in alignment with the holes of members 14 and 15. In addition a double sealing effect is produced, since it is possible that a small amount of oil could leak through between members 14 and 15 at the periphery, either due to a loose stitch, to some damage to the edge of the element, or to a flaw in one of the members 14 and 15 adjacent its periphery. In the construction shown, however, such oil would then have to pass between the separator 21 and one of the members 14 or 15 at the periphery of separator 21. Members 14 and 15, however, are held tightly against the periphery of separator 21 and have proved effectively to minimize the chance of such leakage.

It will be apparent that, to construction the filter element as described, it is necessary that the diameter of the filtering diaphragms must be greater than the diameter of the separator member by an amount not less than, and preferably two or three times, the thickness dimension of the separator at its outer periphery because the top and bottom filtering diaphragms must be bent toward each other near the peripheries thereof to meet each other outside of the periphery of the separator.

The spacer ring 20, as mentioned before, is preferably attached to the exposed face of member 14 by gluing. The upper face of spacer 20 is similarly glued to the lower face 15 of the next adjoining element in assembling the complete cartridge. There are, accordingly, no joints between adjacent members or elements in the complete cartridge that are not effectively bonded one to the other, and no liquid can pass from the outside of the cartridge into the central opening except by passing through a filtering member 14 or 15 or through a spacer 20, if the spacers 20 are made of a liquid-pervious material. Even though there may be some loose stitches 26, and though some liquid thus passes between members 14 and 15, at the periphery, this liquid, assuming the separator 21 to be of pervious material, can only seep in through the periphery of separator 21 into a channel 17 so long as the seal at the crimped portion 27 remains substantially intact.

Rather than gluing spacer 20 to adjacent faces of filtering members as described in Figs. 1 through 3, the cartridge may be made by sewing a spacer between adjacent filtering members as shown in Fig. 4. In this figure spacer 28 is shown between filtering diaphragms 29 and 30 held in place and sealed to each by stitches 31. It will be understood that spacer 28 conforms to the description heretofore given in connection with spacer 20, and that filtering diaphragms 29 and 30 correspond to members 14 and 15 heretofore described. Separators 32, each conforming to separator 21 of Fig. 2, are provided to furnish channels for the oil passing through the filtering members 29 and 30 disposed adjacent thereto.

Construction of the cartridge in accord with this modification is best accomplished by first sewing together a number of subassemblies comprising one member 29 and one member 30 with one member 28 therebetween, and by thereafter peripherally stitching a member 30 of one such subassembly to a member 29 of the next such subassembly interposing a separator 32 prior to this final stitching operation.

A portion of a completed filter cartridge constructed in accord with this modification of my invention is shown in Fig. 5, wherein it will be seen that a filtering member 30 is stitched, by edge stitching 31, to the adjoining member 29 with spacer 28 interposed and stitched in place, and that this latter member 29 is stitched near its outer periphery to a second member 30 with separator 32 interposed and held in place by the crimping 33 formed around members 29 and 30 at the outer periphery of the separator 32.

The method of construction described in connection with Figs. 4 and 5 may be most readily accomplished by the steps in the particular order set forth since the peripheral stitching together of the members 29 and 30 is readily accomplished even though the inner edge stitching 31 has been finished, whereas it would be difficult for a machine to provide the inner stitches 31 after the outer peripheral stitching had been finished.

It has been found that a cartridge constructed in accord with either of the modifications shown may be extended in accordion fashion to about twice its original intended length, from top to bottom, without opening any gaps through which the liquid might flow to by-pass the filter areas, and tightness of the filter in this respect is not decreased through any compression of the members bounding the central opening. It has been found, further, that because of the particular shape of the projections 23, which provide support almost continuously around the central opening, that the projections 23, and particularly the end portions 24, are less subject to compressing than projections otherwise formed. The particular design of the separator 21, or 32, causes the contaminant to be deposited evenly across the whole exposed surfaces of the filtering members 14 and 15, which is highly desirable to provide long filter life for the cartridge. Furthermore, the particular arrangement of the channels in the perforated separator members provides an even disposition of contaminant across the filtering diaphragms and a high flow rate, while being highly resistant to the crushing force of the differential liquid pressure across the filter. Spacers 20 and 28 have been described as being approximately twice as thick as filtering members 14 and 15, or 29 and 30, and it has been found that this proportion is substantially correct for the maximum filter life. It will be understood, however, that the thickness of the filtering members 14 and 15 depends on the type of liquid to be filtered, the porosity of the material used and on many other factors. It will also be understood that the thickness of the separator 21 depends considerably upon the rate of flow of liquid desired, and the stated relationship will serve as a guide in selecting thicknesses to accord with the desired characteristics. Similarly the thickness of the spacer 20 should be selected so as to provide approximately sufficient volume between the exposed confronting faces of adjacent filtering members 14 and 15 in which to accumulate the desired maximum amount of contaminant. This maximum amount is largely dependent upon the permissible differential pressure between the inlet and outlet of the filter. It has been found in using a porous wood pulp filter material of approximately $3/32$ of an inch in thickness that the filter cartridge constructed in accord with my invention will withstand differential pressure of greater than 30 lbs. per square inch without the collapse of members 14 and 15 into the channels 17 or other damage to the filter cartridge, and that in production runs the flow rates of individual cartridges, of the same materials and dimensions, will vary by no more than two percent from the average or mean of the production units. This consistency of flow rates is, in large part, due to the unobstructed large filtering areas of constant extent provided by the arrangement and the elimination of crevices or gaps which may bypass the liquid.

While the filter cartridge is herein shown and described as composed of circular diaphragms, separators, and spacers, defining a central round opening, each of the members being concentric, that is, arranged with their centers in a single line through the center of the cartridge, it will be understood that the outlines of these parts may be square or of other regular shape. In some instances it may prove desirable to depart slightly from a regular shape, in either the peripheral outlines of the diaphragms, separators or spacers, or in the shapes of the openings therein. It is important to the invention, in respect to the opening, only that there be an opening communicating through the several elements to collect or supply the liquid from or to the channels provided in the separators. In respect to the arrangement of the parts of each element, it is important that the outer edge or periphery of the separator, in each instance, fall within the periphery of the enclosing diaphragms whereby the diaphragms may be stitched or otherwise secured together outside of the periphery of the separator. It is, of course, further important that each element be affixed to the confronting diaphragm of the adjacent element through a spacer adjacent the central opening, whereby the only path for the liquid between the opening and the space surrounding the cartridge is through a diaphragm or through some other member which will filter the liquid. It is also important that no force applied to the ends or intermediate portions of the cartridge tending either to elongate or extend the cartridge or to compress the cartridge, if the force is not so great as to destroy the cartridge and is within the limits likely to be encountered, will adversely affect the filtering action by collapsing the diaphragms into the channels 17, or gaps 25, or by opening bypassing passages between the members comprising the cartridge.

While I have shown only certain preferred embodiments of my invention by way of illustration, many modifications will occur to those skilled in the art, and I therefore wish to have it understood that I intend, in the appended claim, to cover all such modifications as fall within the true spirit and scope of my invention.

What I claim as new and desire to secure by United States Letters Patent is:

In a liquid filter cartridge comprising a pair of parallel and substantially coextensive liquid-permeable filtering diaphragms of fibrous, deformable, sheet material, said diaphragms being adapted to be pressed toward each other and arranged to have facing surfaces and oppositely disposed surfaces, said oppositely disposed surfaces being adapted to be in contact with a body of liquid, a sheet material separator interposed between said diaphragms comprising a member of substantially the same material as that of said diaphragms, said member being of constant thickness throughout and having an outer periphery lying everywhere within the area in which said diaphragms are coextensive, said separator having an unbroken outer peripheral ring portion and being perforated to form respective pluralities of alternate spaced-apart legs and ears extending inwardly in a generally radial direction from said unbroken peripheral portion, said legs terminating inwardly to form an opening bounded by the inner ends of said legs, each said leg having a similar enlarged inner end portion extending laterally toward the inner end portions of the respective adjacent legs and spaced therefrom on each side by a distance equal to approximately one-third of the width of each said inner end portion, each said ear terminating at a sufficient distance outwardly from said enlarged portions of the adjacent legs to establish channels along both sides of each ear communicating with said opening between said enlarged inner end portions of adjacent legs, said diaphragms being stitched together peripherally outside of said ring portion to form a first seal at said stitching against the channelling of liquid between said diaphragms and said diaphragms being deformed and crimped by said stitching against the outer peripheral edge of said ring portion to form an inner seal against the channelling of liquid entering through said first seal into said separator channels.

References Cited in the file of this patent

UNITED STATES PATENTS

| Number | Name | Date |
| --- | --- | --- |
| 1,726,035 | Loew | Aug. 27, 1929 |
| 1,944,550 | Ericson | Jan. 23, 1934 |
| 2,103,572 | Wells | Dec. 28, 1937 |
| 2,304,618 | Williams | Dec. 8, 1942 |
| 2,359,475 | Gauthier | Oct. 3, 1944 |
| 2,392,354 | Alsop | Jan. 8, 1946 |
| 2,444,147 | Walton | June 29, 1948 |
| 2,455,486 | Hicks | Dec. 7, 1948 |
| 2,473,979 | Walton | June 21, 1949 |
| 2,495,095 | Ewbank | Jan. 17, 1950 |
| 2,548,584 | Briggs | Apr. 10, 1951 |
| 2,553,820 | Gunn | May 22, 1951 |